(12) United States Patent
Nam et al.

(10) Patent No.: US 11,493,931 B2
(45) Date of Patent: Nov. 8, 2022

(54) METHOD OF EXTRACTING FEATURE FROM IMAGE USING LASER PATTERN AND DEVICE AND ROBOT OF EXTRACTING FEATURE THEREOF

(71) Applicant: LG ELECTRONICS INC., Seoul (KR)

(72) Inventors: Moonsik Nam, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 587 days.

(21) Appl. No.: 16/489,313

(22) PCT Filed: May 14, 2019

(86) PCT No.: PCT/KR2019/005800
§ 371 (c)(1),
(2) Date: Aug. 27, 2019

(87) PCT Pub. No.: WO2020/230921
PCT Pub. Date: Nov. 19, 2020

(65) Prior Publication Data
US 2021/0365026 A1    Nov. 25, 2021

(51) Int. Cl.
*G05D 1/02*       (2020.01)
*G01S 17/894*   (2020.01)
(Continued)

(52) U.S. Cl.
CPC ............. *G05D 1/024* (2013.01); *G01S 17/08* (2013.01); *G01S 17/894* (2020.01);
(Continued)

(58) Field of Classification Search
CPC ..... G01S 17/08; G01S 17/894; G05D 1/0219; G05D 1/024; G05D 1/0248; G05D 1/0251;
(Continued)

(56) References Cited

U.S. PATENT DOCUMENTS 8,311,973 B1 * 11/2012 Zadeh .................... G06N 5/046
706/903
2002/0001029 A1 * 1/2002 Abe ..................... G06V 30/228
348/43

(Continued)

FOREIGN PATENT DOCUMENTS

KR     1020180074976     7/2018
KR       101902969       11/2018
(Continued)

OTHER PUBLICATIONS

PCT International Application No. PCT/KR2019/005800, International Search Report dated Feb. 7, 2020, 3 pages.

*Primary Examiner* — Peter D Le
(74) *Attorney, Agent, or Firm* — Lee, Hong, Degerman, Kang & Waimey PC

(57) ABSTRACT

Provided herein are a method of extracting a feature from an image using a laser pattern and an identification device and a robot including the same, and the identification device for extracting a feature from an image using a laser pattern, which includes a first camera coupled to a laser filter and configured to generate a first image including a pattern of a laser which is reflected from an object, a second camera configured to capture an area overlapping an area captured by the first camera to generate a second image, and a controller configured to generate a mask for distinguishing an effective area using the pattern included in the first image and extract a feature from the second image by applying the mask to the second image.

20 Claims, 17 Drawing Sheets

(51) Int. Cl.
  *G01S 17/08* (2006.01)
  *G06T 5/00* (2006.01)
  *G06T 5/50* (2006.01)

(52) U.S. Cl.
  CPC ......... *G05D 1/0219* (2013.01); *G05D 1/0248* (2013.01); *G05D 1/0251* (2013.01); *G06T 5/004* (2013.01); *G06T 5/50* (2013.01)

(58) Field of Classification Search
  CPC . G06T 2207/30261; G06T 5/004; G06T 5/50; G06T 7/521; G06V 10/143; G06V 20/10; G06V 20/58
  See application file for complete search history.

(56) References Cited

U.S. PATENT DOCUMENTS

| | | | | |
|---|---|---|---|---|
| 2003/0072569 A1* | 4/2003 | Seo | ........................ | G03B 35/10 348/E13.02 |
| 2006/0100741 A1* | 5/2006 | Jung | .................... | G05D 1/0255 700/258 |
| 2008/0123929 A1* | 5/2008 | Kitamura | ............... | G06T 7/0012 382/155 |
| 2009/0185800 A1* | 7/2009 | Lee | ........................ | G03B 7/003 396/213 |
| 2011/0025827 A1* | 2/2011 | Shpunt | ..................... | H04N 5/33 348/46 |
| 2014/0307056 A1* | 10/2014 | Collet Romea | ......... | G06V 10/28 348/46 |
| 2015/0229911 A1* | 8/2015 | Ge | .......................... | G06T 7/521 348/47 |
| 2016/0005219 A1* | 1/2016 | Powell | .................. | G06F 3/0425 345/426 |
| 2016/0104314 A1* | 4/2016 | Nakazato | .................. | G06T 7/50 382/285 |
| 2017/0230633 A1 | 8/2017 | Doh | | |
| 2017/0278289 A1* | 9/2017 | Marino | .................... | G06T 11/60 |
| 2018/0059248 A1 | 3/2018 | O'Keeffe | | |
| 2018/0139431 A1* | 5/2018 | Simek | .................. | H04N 5/2258 |
| 2018/0205925 A1 | 7/2018 | Doh et al. | | |

FOREIGN PATENT DOCUMENTS

| | | |
|---|---|---|
| WO | 2015008873 | 1/2015 |
| WO | 2017007166 | 1/2017 |

* cited by examiner

AREA OF FIRST CAMERA :
AREA OF SECOND CAMERA :
COMMON AREA :

FIG. 9
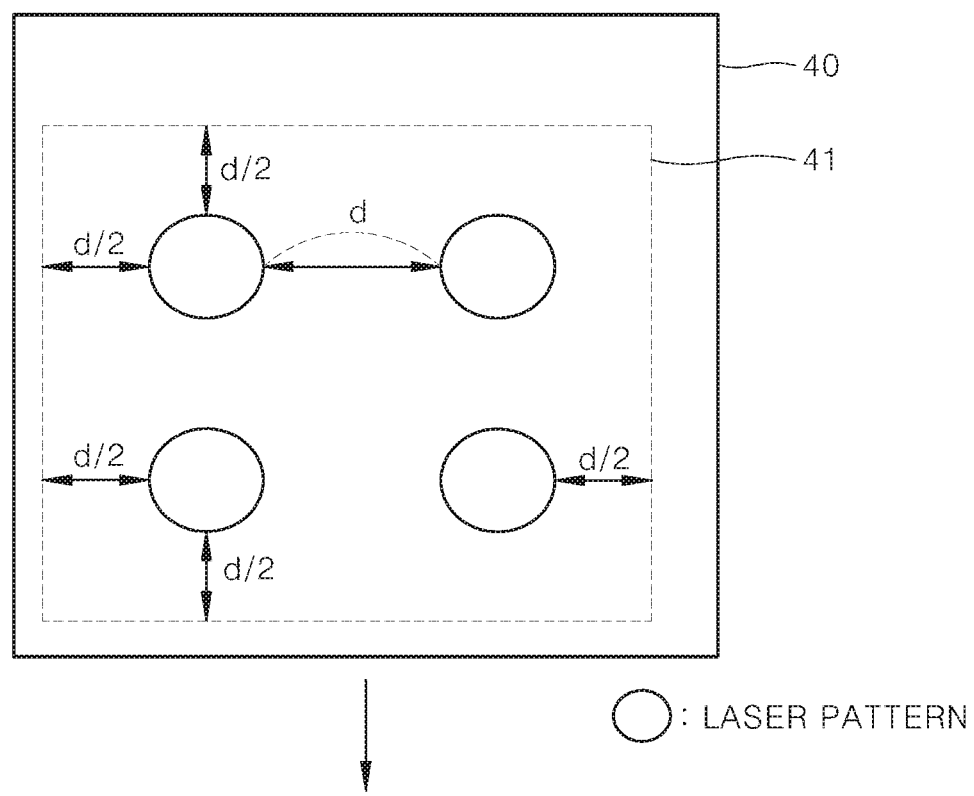
◯ : LASER PATTERN
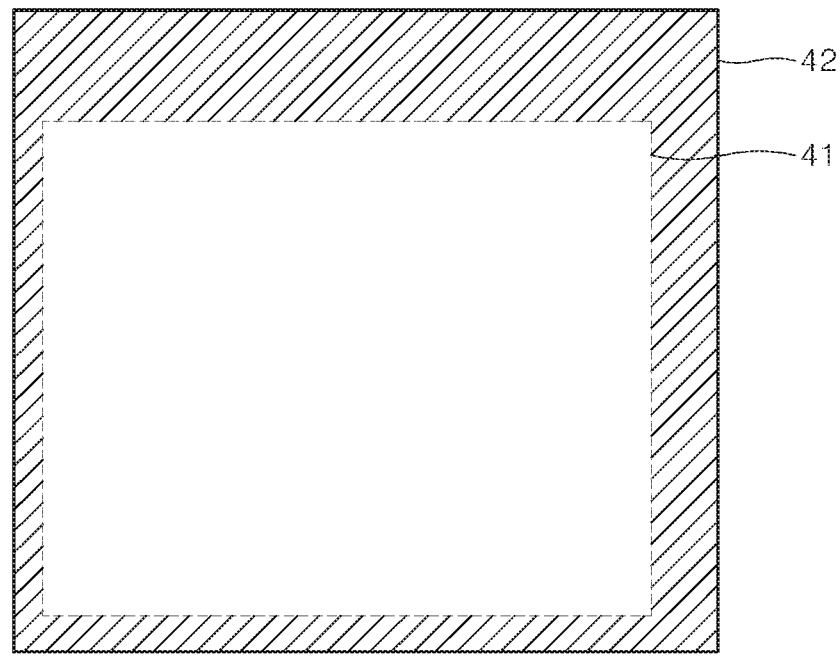

FIG. 11
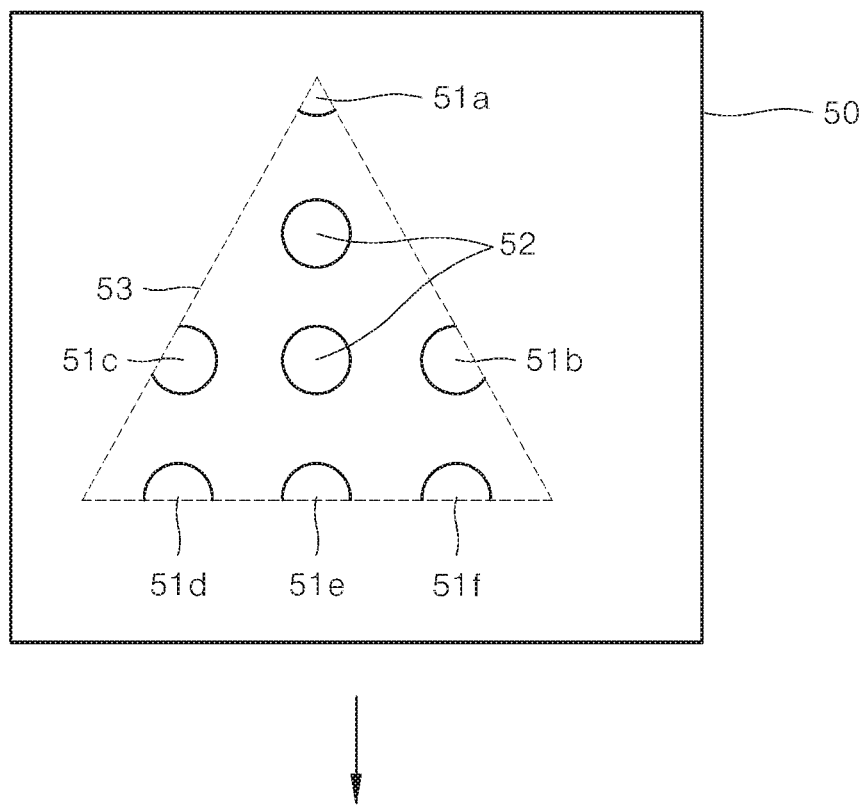
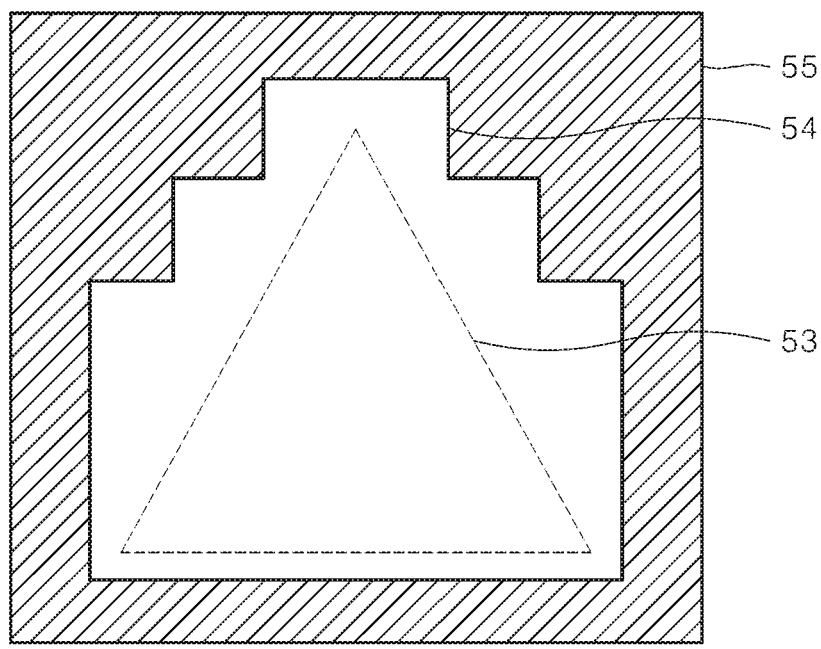

FIG. 14
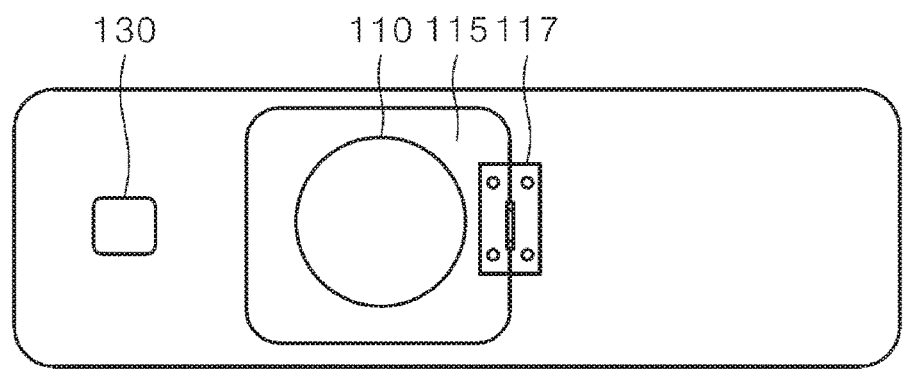
71
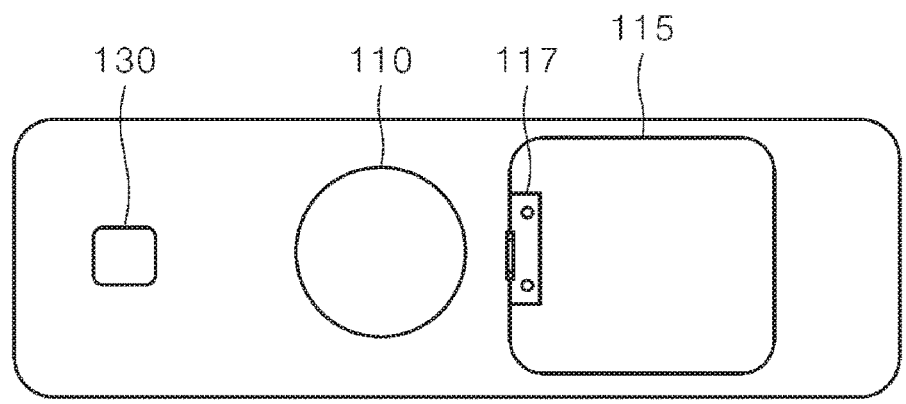
72

FIG. 15
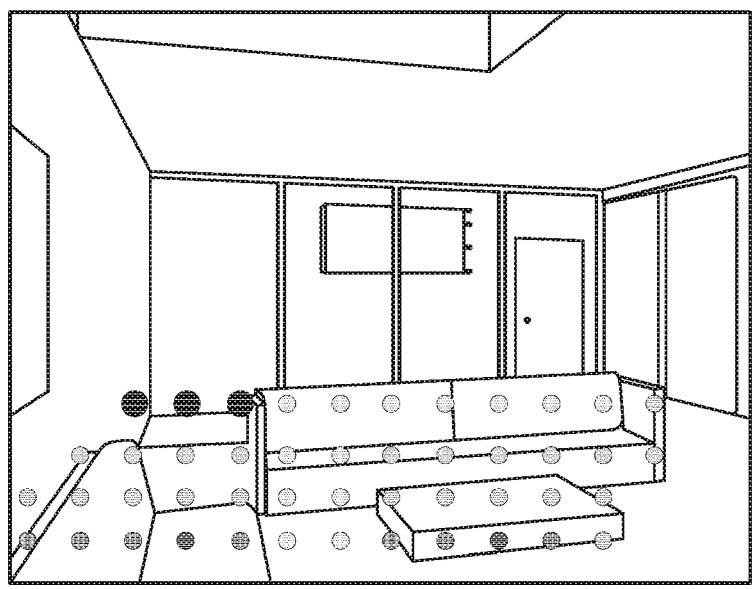
73
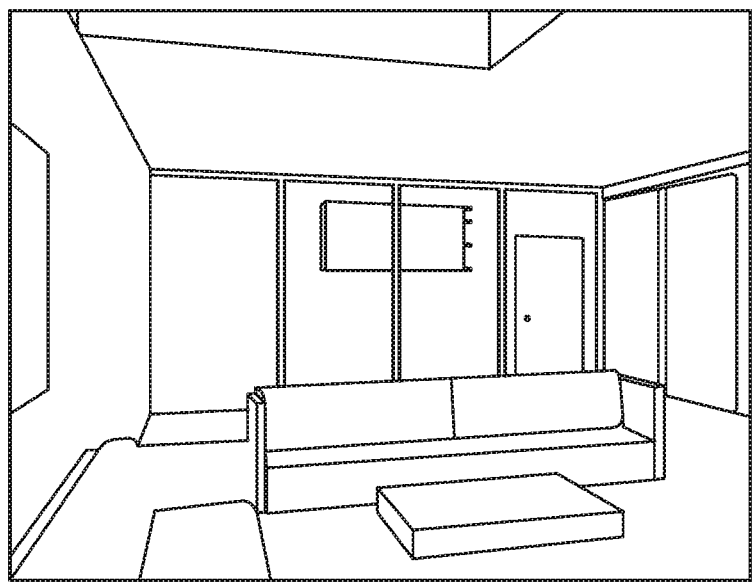
74

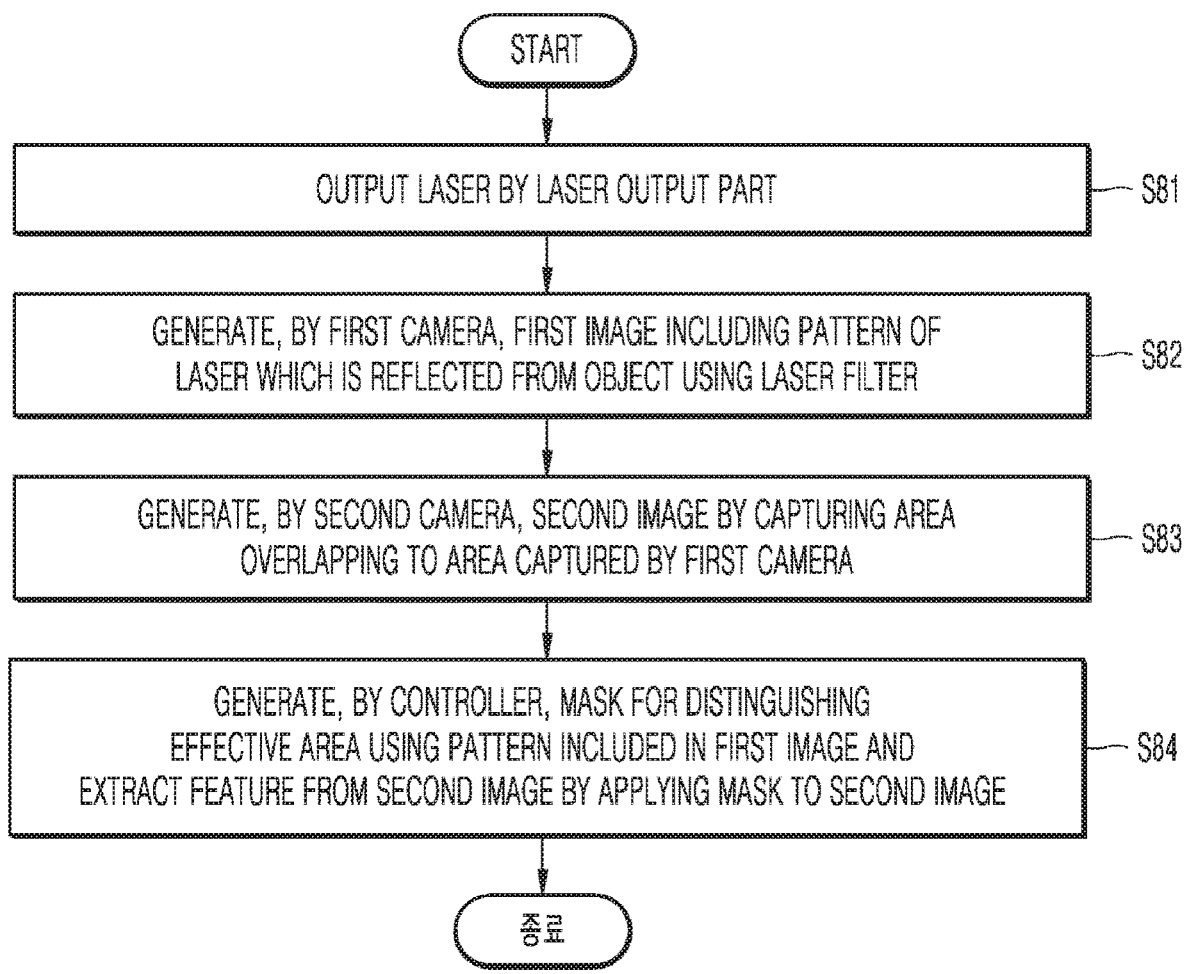

METHOD OF EXTRACTING FEATURE FROM IMAGE USING LASER PATTERN AND DEVICE AND ROBOT OF EXTRACTING FEATURE THEREOF

CROSS-REFERENCE TO RELATED APPLICATIONS

This application is the National Stage filing under 35 U.S.C. 371 of International Application No. PCT/KR2019/005800, filed on May 14, 2019, the contents of which are hereby incorporated by reference herein in its entirety.

TECHNICAL FIELD

The present invention relates to a method of extracting a feature from an image using a laser pattern and a robot using the same.

BACKGROUND ART

Recently, as the need arises for a robot or an autonomous device to measure a distance to external objects or to verify an object among the external objects, which have an influence on driving, various methods of measuring a distance and detecting an object have been proposed.

For example, a method of outputting a predetermined signal and using a reflection time of the predetermined signal has been proposed. Alternatively, a method of measuring a distance by calculating a depth image, which includes three-dimensional distance information, using a depth camera has also been proposed.

Meanwhile, there is a limitation in that a depth measurement for measuring a distance to an object using an image should have a separate depth camera aside from an arithmetic operation amount.

However, in the case of determining an object close to the robot instead of accurate depth information of the object in an autonomous driving process, when a three-dimensional depth camera is used, there occurs a problem of increasing costs and an arithmetic operation time.

Thus, in this disclosure, a method of extracting a feature from an image using a laser pattern will be described.

DISCLOSURE

Technical Problem

The present invention is directed to providing a method of extracting a feature on the basis of objects disposed at short range in identifying an image and extracting a feature from the image.

The present invention is further directed to providing a method of outputting a laser, capturing an image including an object reflecting the laser, and using a laser pattern reflected in the image so as to identify an object which is disposed at short range.

The present invention is further directed to providing a method of generating a mask using a laser pattern disposed on an object and removing objects disposed at long range from an image.

Objectives of the present invention are not limited to the above-described objectives, and other objectives and advantages of the present invention, which are not mentioned, can be understood by the following description and also will be apparently understood through embodiments of the present invention. Further, it should also be easily understood that the objectives and advantages of the present invention may be realized and attained by means and a combination thereof described in the appended claims.

Technical Solution

One aspect of the present invention provides an identification device for extracting a feature from an image using a laser pattern, which includes a first camera coupled to a laser filter and configured to generate a first image including a pattern of a laser which is reflected from an object, a second camera configured to capture an area overlapping an area captured by the first camera to generate a second image, and a controller configured to generate a mask for distinguishing an effective area using the pattern included in the first image and extract a feature from the second image by applying the mask to the second image.

Another aspect of the present invention provides an identification device for extracting features from an image using a laser pattern, which includes a camera having a laser filter which is selectively disposed therein and configured to generate a first image including a pattern of the laser which is reflected from an object and a second image not including the pattern, a filter controller configured to selectively dispose the laser filter on the camera, and a controller configured to generate a mask for distinguishing an effective area using the pattern included in the first image and extract features from the second image by applying the mask to the second image.

The controller may generate a boundary line of a separation distance on the basis of a pattern located on an outer portion among the patterns to generate an effective area, and the controller may generate the mask to leave only the effective area in the first image.

The controller may calculate a distance of an area in which the pattern is reflected in inverse proportion to a size of the pattern.

Still another aspect of the present invention provides a robot including an identification device for extracting features from an image using a laser pattern, which includes an obstacle sensor configured to sense an object disposed in a vicinity of the robot, a robot controller configured to generate a movement path of the robot on the basis of the features extracted by the identification device, and a moving part configured to move the robot along the movement path.

Yet another aspect of the present invention provides a method of extracting a feature from an image using a laser pattern, which includes outputting, by a laser output part, a laser; generating, by a first camera, a first image including patterns of the laser which is reflected from an object using a laser filter; capturing, by a second camera, an area overlapping an area captured by the first camera to generate a second image; and generating, by a controller, a mask for distinguishing an effective area using the pattern included in the first image to extract a feature from the second image by applying the mask to the second image.

Advantageous Effects

When the embodiments of the present invention are applied, a time taken for a feature matching process can be reduced by extracting features of objects disposed in the vicinity.

When the embodiments of the present invention are applied, a laser is output so that an image including an object reflecting the laser can be captured and an object at short distance can be identified using the reflected laser pattern in the image.

When the embodiments of the present invention are applied, a laser pattern disposed on an object can be used to generate a mask which removes objects at long distance from the image.

The effects of the present invention are not limited to the above-described effects, and those skilled in the art to which the present invention pertains can easily derive various effects of the present invention from the configuration thereof.

DESCRIPTION OF DRAWINGS

FIGS. 9 to 12 are diagrams illustrating various methods of generating a mask according to one embodiment of the present invention.

FIGS. 13 and 14 are diagrams illustrating an identification device including a single camera according to another embodiment of the present invention.

FIG. 15 is a diagram illustrating an image generated by the identification device of FIGS. 13 and 14.

FIG. 17 is a flowchart illustrating a process of extracting a feature from an image by the identification device according to one embodiment of the present invention.

DETAILED DESCRIPTION

Figure 1:
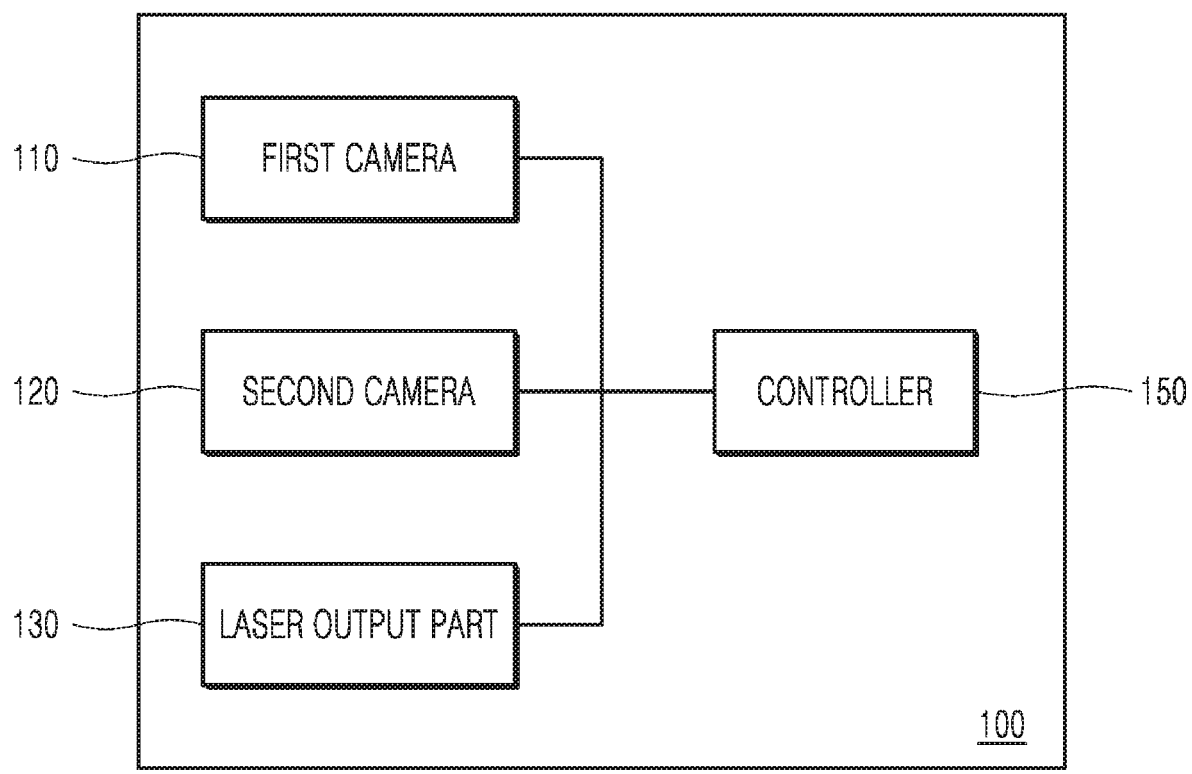
FIG. 1 is a diagram illustrating a configuration of an identification device according to one embodiment of the present invention.

Embodiments of the present invention will be fully described in detail below which is easily practiced by those skilled in the art to which the present invention pertains with reference to the accompanying drawings. The present invention may be implemented in various different forms and thus it is not limited to embodiments which will be described herein.

In order to clearly describe the present invention, some portions not related to the description will be omitted and not be shown, and the same reference numerals are given to the same or similar components throughout this disclosure. Further, some embodiments of the present invention will be described in detail with reference to the illustrative drawings. In giving reference numerals to components of the drawings, the same reference numerals may be given to the same components even though the same components are shown in different drawings. Further, in the following description of the present invention, if a detailed description of related known configurations or functions is determined to obscure the gist of the present invention, the detailed description thereof will be omitted.

In describing components of the present invention, terms "first," "second," A, B, (a), (b), and the like can be used. These terms are intended to distinguish one component from other components, but the nature, sequence, order, or number of the components is not limited by those terms. When components are disclosed as "connected," "coupled," or "contacted" to other components, the components can be directly connected or contacted to the other components, but it should be understood that another component(s) could be "interposed" between the components and the other components or could be "connected," "coupled," or "contacted" therethrough.

For convenience of description, in implementing the present invention, components can be described as being segmented. However, these components can be implemented in a single device or module, or a single component can be implemented by being segmented into a plurality of device or modules.

FIG. 1 is a diagram illustrating a configuration of an identification device according to one embodiment of the present invention. The identification device of FIG. 1 may operate on its own or in combination with an autonomous driving device such as a robot. An identification device 100 includes two cameras 110 and 120, a laser output part 130, and a controller 150.

According to one embodiment of the present invention, examples of the two cameras 110 and 120 include gray cameras. Alternatively, according to another embodiment of the present invention, examples of the two cameras 110 and 120 include color cameras instead of the gray cameras. The laser output part 130 outputs a laser of a specific pattern, and the laser is reflected on a front object.

The first camera 110 is coupled to a laser filter and recognizes a laser pattern which is output from the laser output part 130 and then reflected from an object to generate a first image including the reflected laser pattern.

The second camera 120 continuously generates a two-dimensional image to generate a matching result between the images. The second camera 120 captures an area overlapping an area captured by the first camera 110 to generate a second image.

The first camera 110 operates according to a predetermined capturing period and generates the laser pattern according to the predetermined capturing period.

Since an amount of the laser reflected from an object at a predetermined distance or more may be very small or there may be no reflector, the laser of a specific pattern which is output from the laser output part 130 is not applied in the first image captured by the first camera 110. This is because light is scattered such as to fade as a distance is increased according to a general physical characteristic of the laser so that, when the laser is reflected from a distant object, the pattern of laser is not included in the image captured by the first camera 110.

Thus, the controller 150 generates a mask for a section (image matching section) in which the images (first and second images) captured by the two cameras 110 and 120 are matched and determines that a portion not including the laser pattern is a distant object in the image captured by the first camera 110. Consequently, the controller 150 determines that the portion not including the laser pattern is an invalid area (not valid, outlier). Further, the controller 150 removes the invalid part from the result, which is obtained by matching the images captured by the two cameras using the mask.

That is, the controller 150 generates a mask for distinguishing an effective area using a pattern included in the first image and extracts a feature from the second image by applying the mask to the second image. This enables extracting only a feature of a meaningful object by removing an object which is not close from the images.

Figure 2:
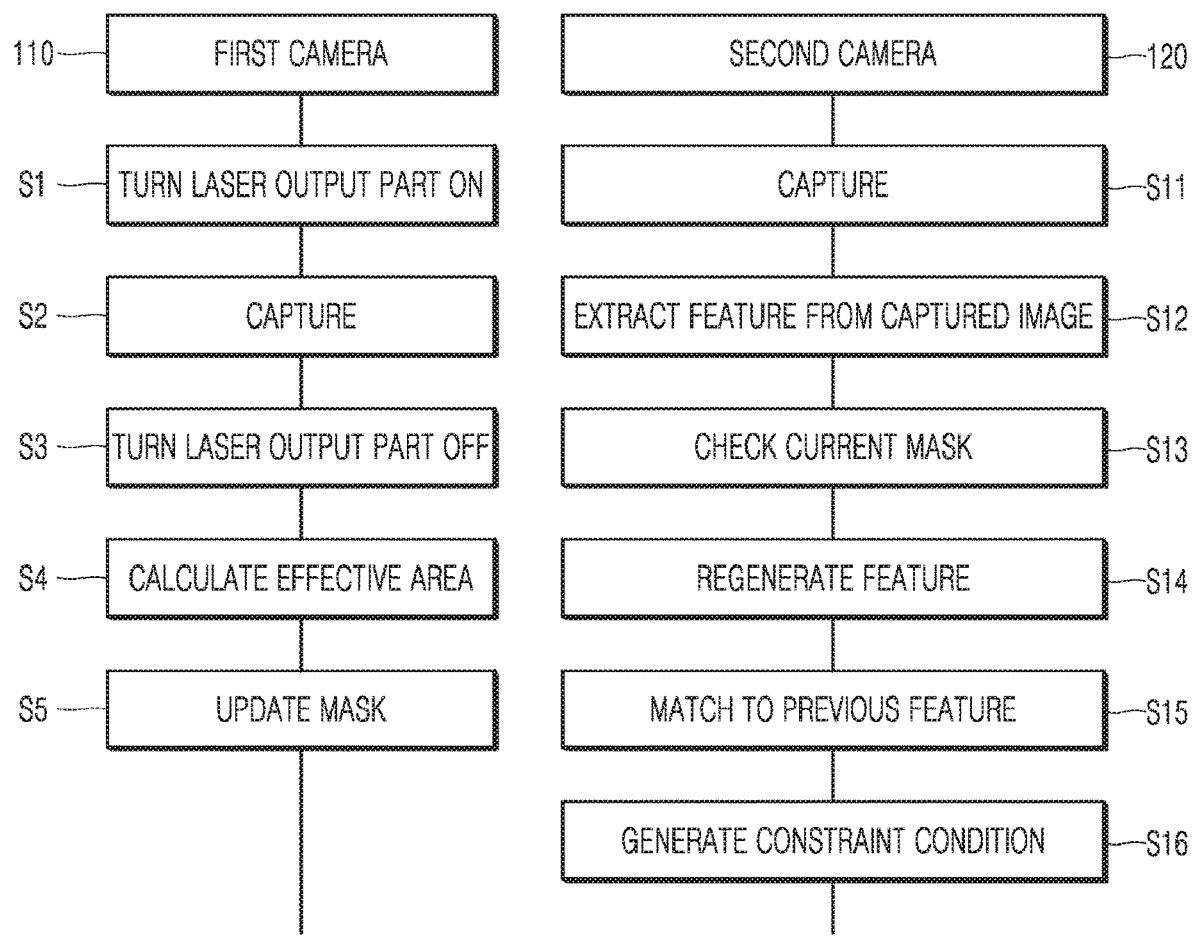
FIG. 2 is a diagram illustrating a process in which two cameras operate according to one embodiment of the present invention.

FIG. 2 is a diagram illustrating a process in which two cameras operate according to one embodiment of the present invention.

The first camera 110 operates to be interlocked with the laser output part 130 to continuously update the mask. That is, the laser output part 130 is turned on under the control of the controller 150 (S1). Then, the first camera 110 captures front objects to generate an image k (S2). When the capturing is completed, the laser output part 130 is turned off under the control of the controller 150 (S3).

The first camera 110 or the controller 150 calculates an effective area R in the image captured in operation S2. The effective area includes an area in which the laser output from the laser output part 130 is included, i.e., an area of objects which is close enough to be displayed by the laser.

The first camera 110 or the controller 150 updates a mask m (S5).

Meanwhile, the second camera 120 also captures the front objects at an $n^{th}$ viewpoint to generate an image i_n (S11). The $n^{th}$ viewpoint is a viewpoint at which the second camera 120 continuously captures the objects. The $n^{th}$ viewpoint means a viewpoint after $(n-2)^{th}$ and $(n-1)^{th}$ viewpoints.

The second camera 120 or the controller 150 extracts a feature from the image i_n captured at the $n^{th}$ viewpoint (S12). The extracted feature is a feature E_n of the $n^{th}$ viewpoint.

Then, the second camera 120 or the controller 150 verifies a current mask (S13). This is an example in which the second camera 120 or the controller 150 sets the mask m, which is generated in operation S5 based on a current viewpoint, to the current mask m_cur.

Then, the second camera 120 or the controller 150 regenerates a new feature E_n' from the previously extracted feature E_n using the updated mask.

The second camera 120 or the controller 150 matches E_n' to E_n-1' which is regenerated at a previous viewpoint ($n-1^{th}$ viewpoint) (S15).

The second camera 120 or the controller 150 generates a new constraint condition with respect to an image at the $n^{th}$ viewpoint (S16).

The second camera 120 may apply a mask of operation S5 so as to extract a feature from an important object in the process of extracting the feature. When the mask of operation S5 is applied to the image captured by the second camera 120, objects at long distance are removed from the image. As a result of removing the objects at long distance, only features of objects at short distance are extracted.

When the process of FIG. 2 is applied, the first camera 110 operates to be continuously interlocked with the laser output part 130. Consequently, the first camera 110 or the controller 150 determines that the objects at short distance are disposed in an area in which the laser is reflected. The first camera 110 or controller 150 may continuously update a mask which removes an area of the objects at long distance from the image, that the area is where the laser is not reflected. The second camera 120 or the controller 150 applies the updated mask to the image captured by the second camera 120 to select only a feature of the effective area in the process of feature matching.

Synchronization between the components (the first and second camera and the laser output part) may be varied according to a preset interval or a moving speed of the device. Alternatively, the controller 150 may set the number of common features between the images captured by the second camera 120 to be in inverse proportion to a capturing interval between the images.

When the number of common features is large, since a variation of external objects is not large, the controller 150 extends a capturing interval of the camera to allow the camera to capture the image with a long interval. On the contrary, when the number of common features is small, since the variation of the external objects is large, the controller 150 shortens the capturing interval of the camera to allow the camera to capture the image with a short interval.

In the case of applying the above-described embodiment, since objects close to the identification device may be selected using the output laser pattern, a function of a pseudo laser depth may be implemented.

In implementing visual odometry, a feature may be extracted and matched only in an important area of the captured image. This increases a matching speed in a visual odometry process.

In the process of FIG. 2, a mask may be applied without performing operation S12 to remove an unnecessary area from the image and then a new feature may be extracted in operation S14.

That is, in the second image captured by the second camera 120, the controller 150 may calculate N features (S12). Then, the controller 150 compares the first image captured by the first camera 110 with the second image captured by the second camera 120 to calculate an overlapping area and apply the mask of operation S5 to the overlapping area. Consequently, unnecessary portions are removed from the second image so that the controller 150 selects M features among the N features. Here, M≤N is satisfied.

Figure 3:
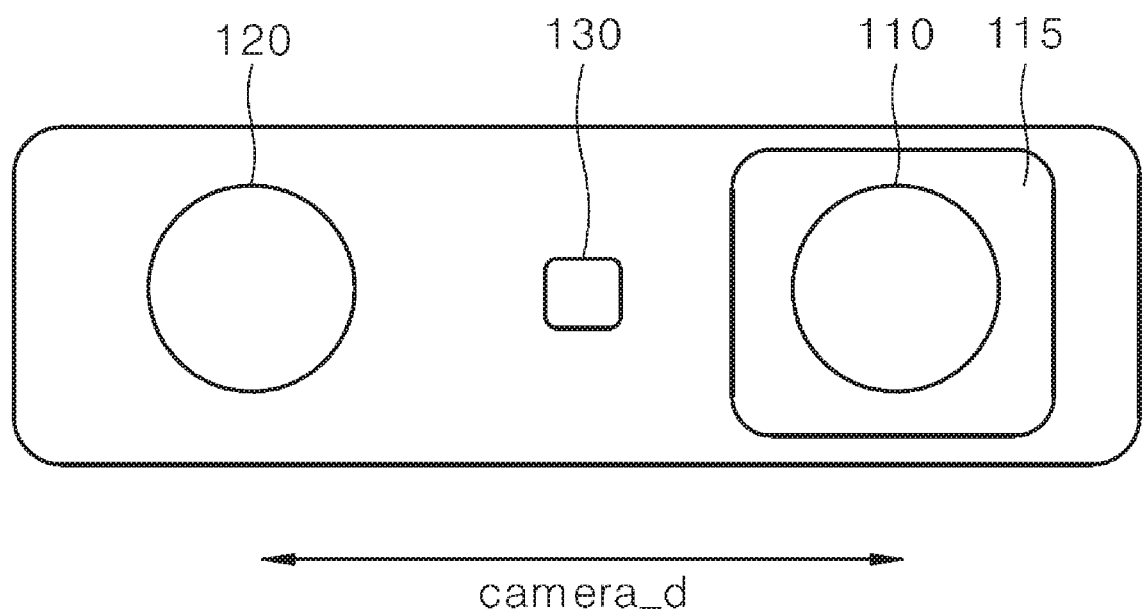
FIG. 3 is a diagram illustrating an appearance of the device according to one embodiment of the present invention.

FIG. 3 is a diagram illustrating an appearance of the device according to one embodiment of the present invention. FIG. 3 shows an exemplary appearance of the identification device of the present invention, but the present invention is not limited thereto.

The laser output part 130 is disposed between the first camera 110 and the second camera 120. According to a distance camera_d between the first camera 110 and the second camera 120 or directivity angles of the two cameras 110 and 120, a slight difference between the image captured by the first camera 110 and the image captured by the second camera 120 may occur.

The first camera 110 includes a laser filter 115 which is required for capturing an image of the laser, which is output from the laser output part 130, reflected from an object.

FIGS. 4 to 8 are diagrams illustrating a process of extracting a feature from an image by the identification device according to one embodiment of the present invention.

Figure 4:
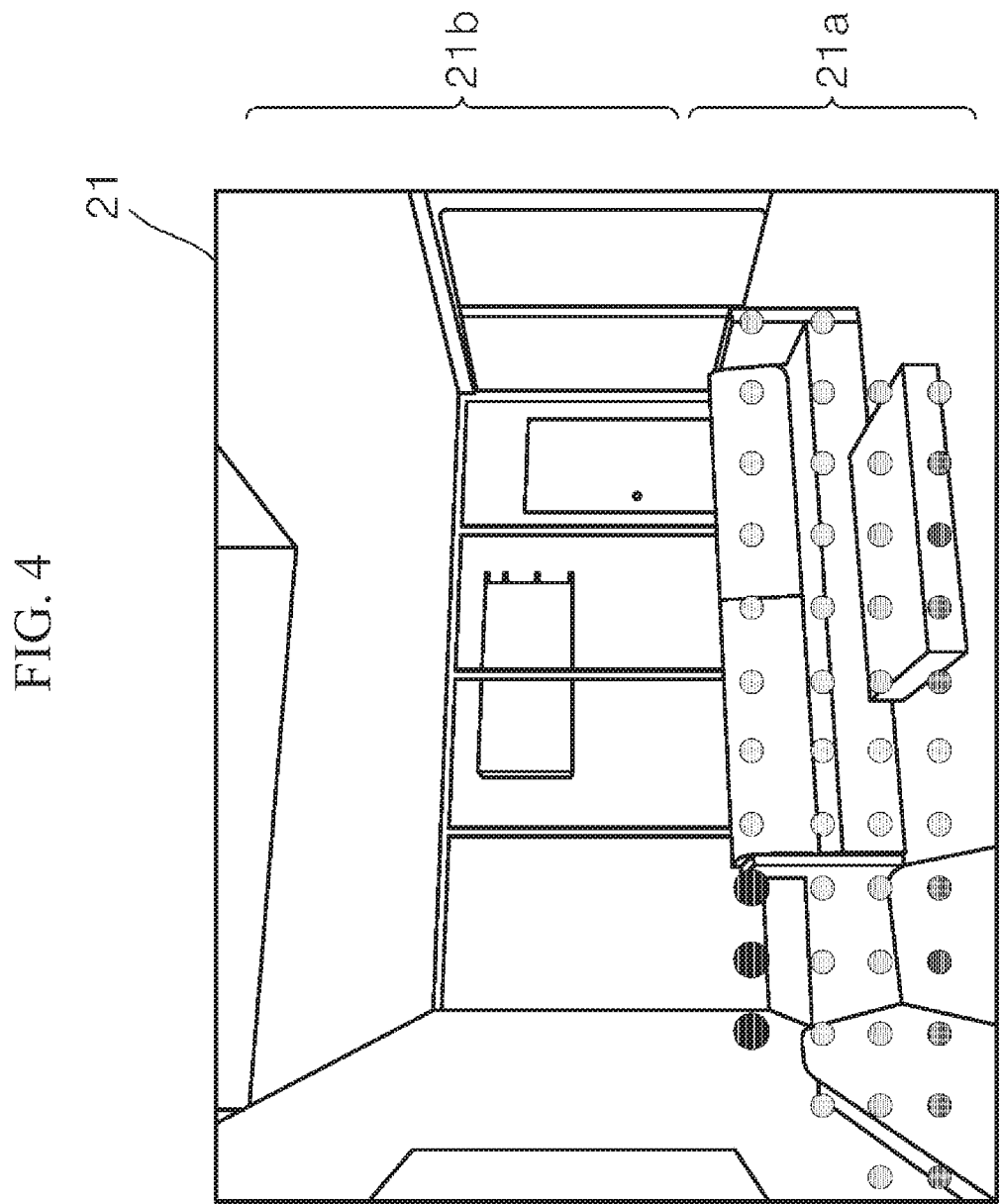
FIGS. 4 to 8 are diagrams illustrating a process of extracting a feature from an image by the identification device according to one embodiment of the present invention.
Figure 5:
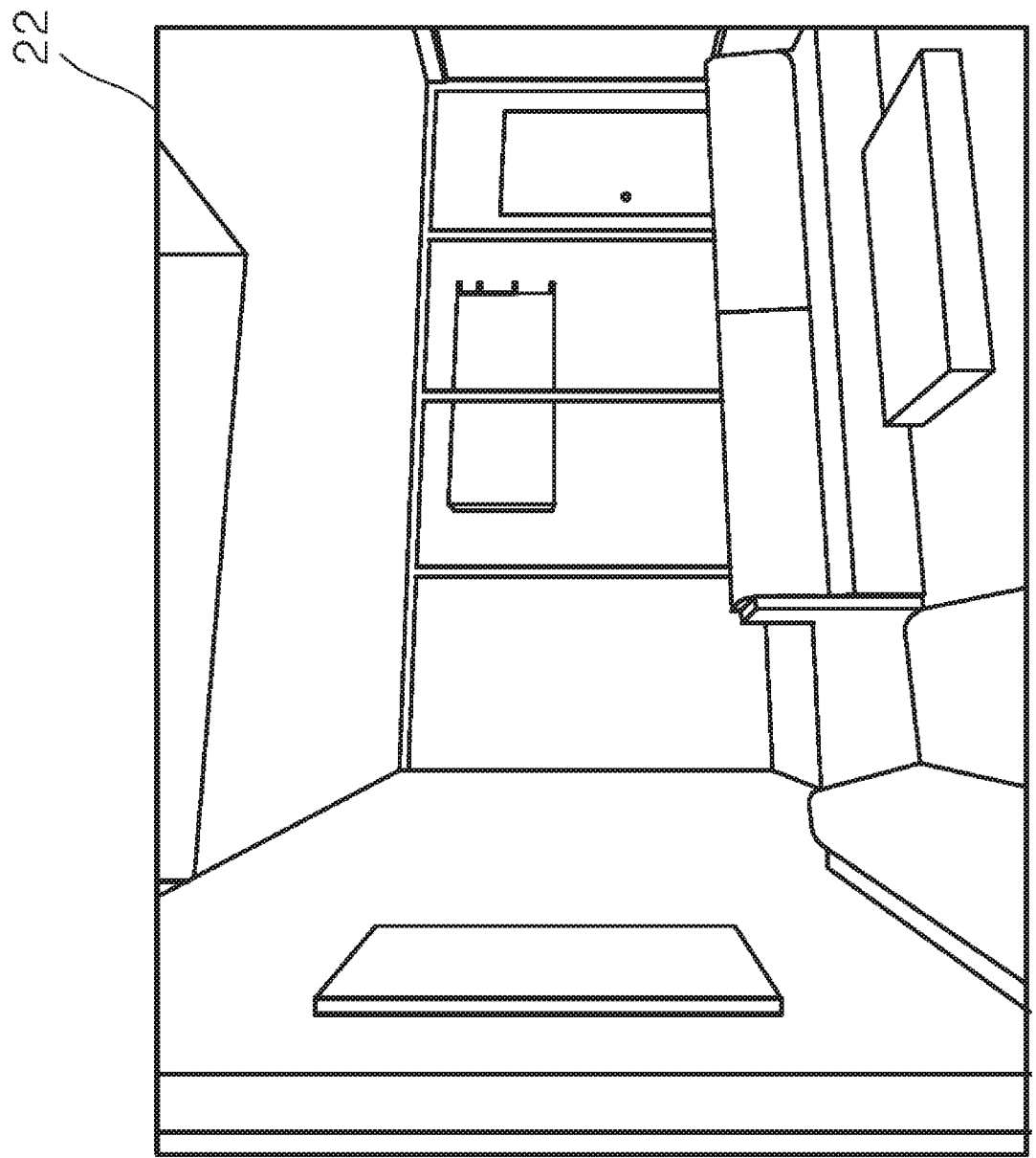

FIG. 4 illustrates an image 21 captured by the first camera 110. FIG. 5 illustrates an image 22 captured by the second camera 120. The image 21 is an example of the image k captured in operation S2 of FIG. 2, and the image 22 is an example of the image i_n captured in operation S11 of FIG. 2.

In the image 21, circles disposed in an area 21a are laser patterns. The laser, which is output from the laser output part 130, reflected from an object is captured by the first camera 110. Before capturing by the first camera 110, the laser output part 130 is turned on to output a laser of a specific pattern under the control of the controller 150 or the first camera 110, and then the first camera 110 captures the reflected laser pattern.

Since an area 21b includes objects at long distance, these objects do not reflect the laser or reflect the laser at a very small size so that these objects are not captured by the first camera 110.

Meanwhile, the image 22 is an image captured by the second camera 120. When the image 21 is compared with the image 22, portions of the images on an edge side are inconsistent.

Figure 6:
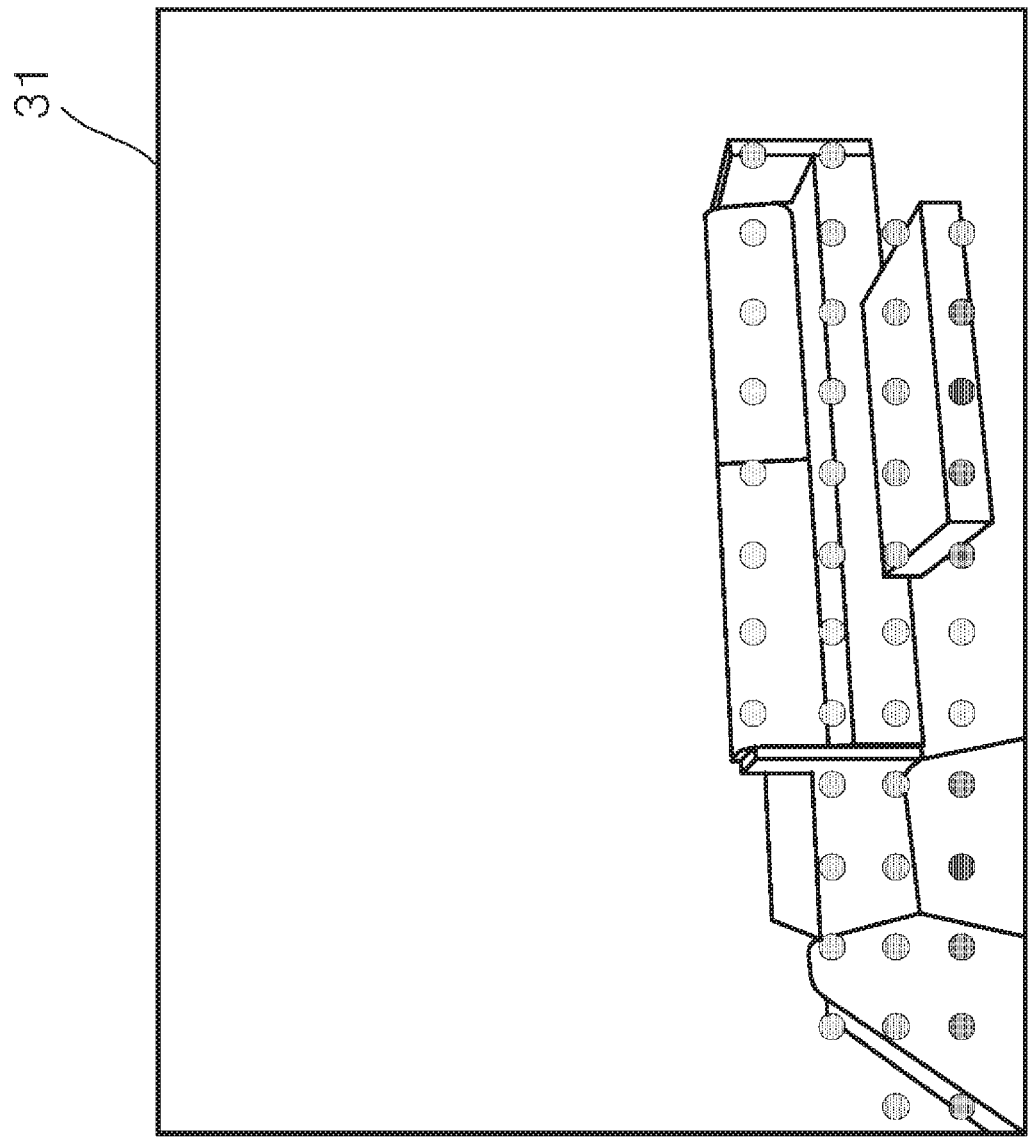

FIG. 6 illustrates a result of generating a mask according to one embodiment of the present invention. In the image indicated by the reference numeral 21 of FIG. 4, an area in which the laser is not verified includes objects at long distance. Thus, these objects are objects included in unnecessary or meaningless areas in feature extracting.

Consequently, the controller 150 or the first camera 110 generates an image 31 as the mask m of FIG. 2 which removes the area, in which the laser is not verified, from the image 21.

Figure 7:
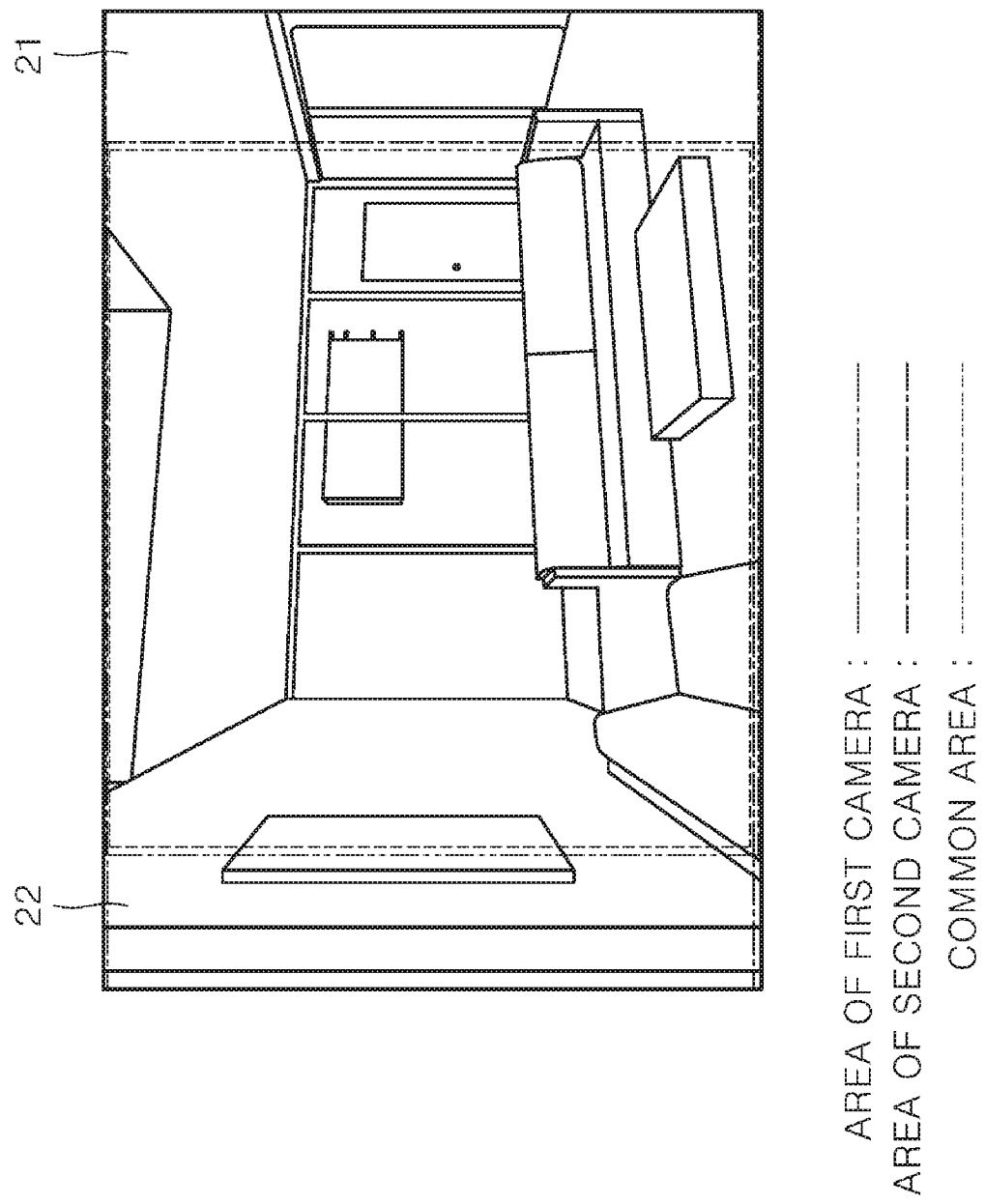

FIG. 7 illustrates a common area in the images captured by the two cameras according to one embodiment of the present invention. In order to apply the mask of FIG. 6, the controller 150 identifies a common area between the image 21 captured by the first camera 110 and the image 22 captured by the second camera 120.

The common area may be varied according to a distance between the two cameras in FIG. 3 or capturing angles of the two cameras. In the above process, the first camera 110 may selectively remove the laser pattern from the image 21. Alternatively, the first camera 110 may capture one image immediately before the laser pattern is output and then may capture another image on which the laser pattern is marked immediately after the laser pattern is output.

The controller 150 identifies the common area and then applies the mask of FIG. 6. Thus, as shown in FIG. 8, objects at long distance are removed from the common area, and then only objects at short distance are included in the image.

Figure 8:
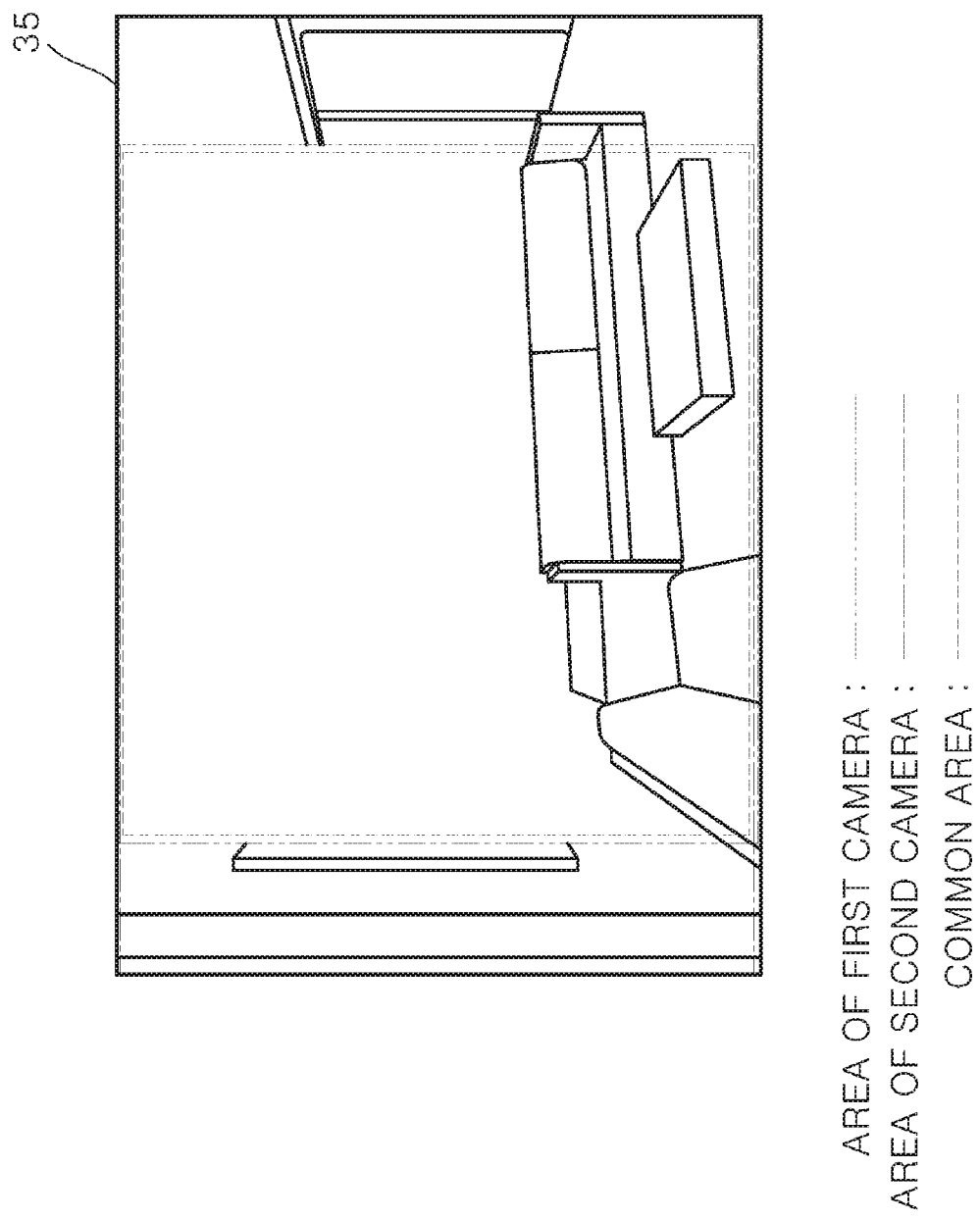

The controller 150 may extract feature points from an image 35 of FIG. 8. Consequently, the controller 150 may extract features with respect to the objects in a meaningful area (a short distance area).

Further, the controller 150 may generate a constraint condition by comparing feature points extracted at a previous time point with the feature points extracted at the current time point. The constraint condition is an example of constraint conditions required for verifying a current position in the process of performing the visual odometry by a robot or a vehicle.

FIGS. 9 to 12 are diagrams illustrating various methods of generating a mask according to one embodiment of the present invention. The mask is generated on the basis of an area in which the laser is marked. The controller 150 generates an effective area by generating a boundary line of a separation distance on the basis of a pattern located on an outer side among patterns of the first image captured by the first camera 110. The controller 150 may generate the mask so as to leave only the effective area in the first image.

FIG. 9 illustrates a mean method of setting the mask on the basis of a pattern interval using regularity of the laser patterns. FIG. 9 illustrates an example in which, when a plurality of patterns are disposed in the first image captured by the first camera 110, the controller 150 determines a separation distance by reflecting distances between the patterns.

Circles in FIG. 9 mean laser patterns. When an interval between the laser patterns, which are verified on an image 40, is d, the controller 150 determines an effective area 41 on the basis of a d/2 interval in an outermost laser pattern.

Thus, the controller 150 may set a mask 42 which removes an area except for the effective area from the image 40.

Figure 10:
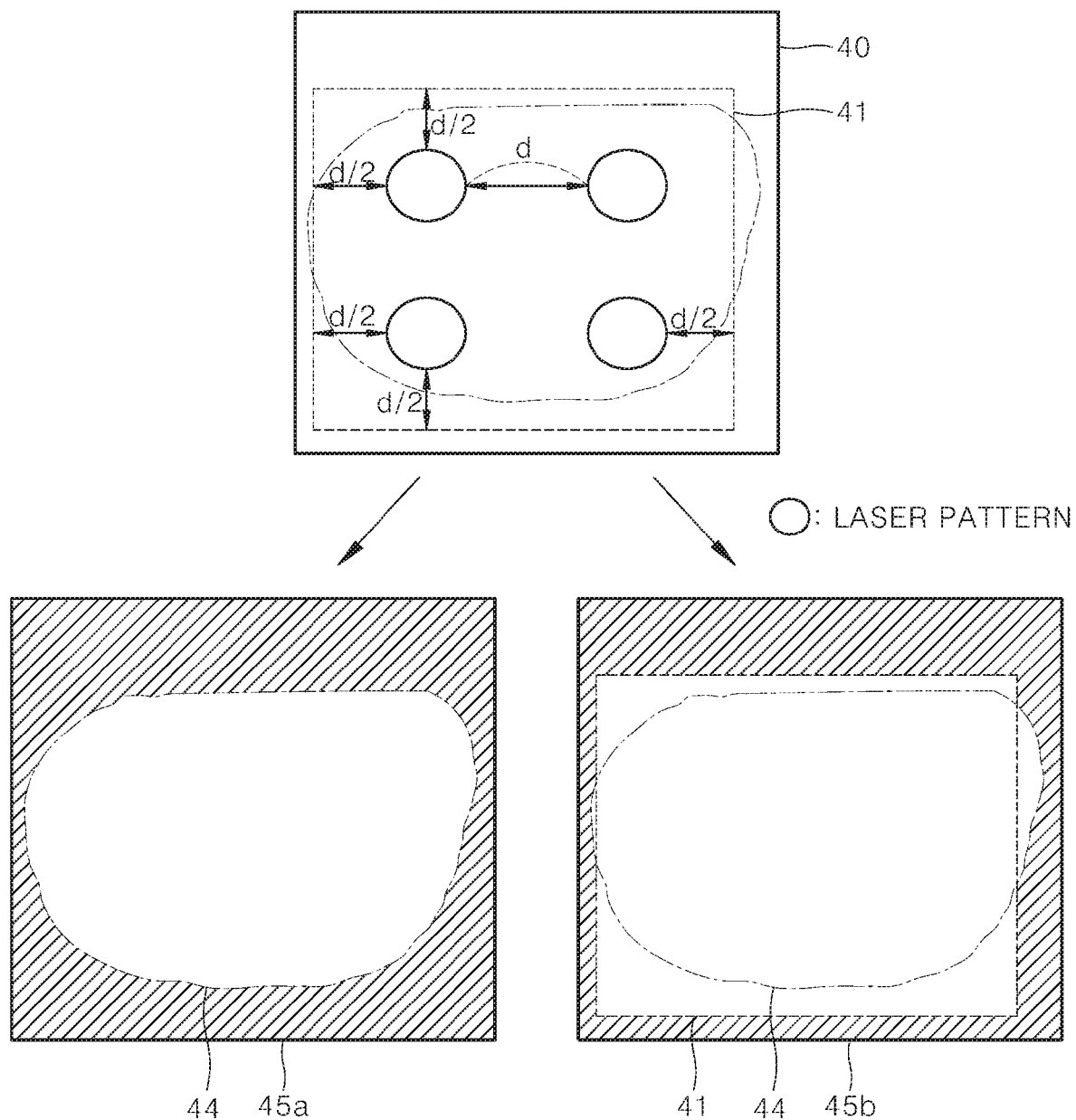

FIG. 10 shows an example in which, in addition to the laser pattern, the controller 150 determines the effective area on the basis of a boundary line 44 of the image including the laser pattern. FIG. 10 illustrates an example in which, when a pattern is included in a boundary line of the same object in the first image captured by the first camera 110, the controller 150 includes an area within the boundary line in the effective area.

That is, when the boundary line of the object is verified in the effective area which is identified by the laser pattern, the controller 150 may determine the effective area to the boundary line.

In FIG. 10, the area verified by the laser pattern is the 41, but the controller 150 may determine a boundary line of the object including the laser patterns as a reference numeral 44. In this case, the controller 150 may generate a mask 45a for removing an area except for the effective area on the basis of the boundary line 44 of a corresponding object.

Alternatively, the controller 150 may set the boundary line of the corresponding object and the interval d/2 of the laser pattern as an effective area, and may generate a mask 45b for removing other area.

FIG. 11 illustrates an example in which, when the laser pattern is distorted, the controller 150 determines that the distorted laser pattern is disposed at the boundary of the object and sets a boundary of an effective area on the basis of the determination result.

FIG. 11 illustrates an example in which, when a pattern having a shape that is different from that of the pattern output from the laser output part 130 is included in the first image captured by the first camera 110, the controller 150 extends a cross section of the different shaped pattern to generate an effective area.

In an image 50 of FIG. 11, the controller 150 verifies laser patterns 52 having circular shapes and laser patterns 51a to 51f having cross sections. Further, the patterns having the cross sections are connected to other adjacent patterns to form a line. For example, the controller 150 may set an effective area on the basis of a parallel cross section.

The controller 150 connects both cross sections of the 51a to the 51b and 51c, respectively. The controller 150 connects the cross sections of 51d, 51e, and 51f as a single line. Further, the controller 150 verifies that an area 53 connecting these cross sections includes the laser patterns 52.

The controller 150 determines that a shape of an object has a boundary that is the same as that of the area 53 to generate an effective area on the basis of the area 53. For example, the controller 150 generates an effective area 54 which includes a predetermined distance on the basis of the area 53. The controller 150 may generate a mask 55 which removes an area except for the effective area 54.

Figure 12:
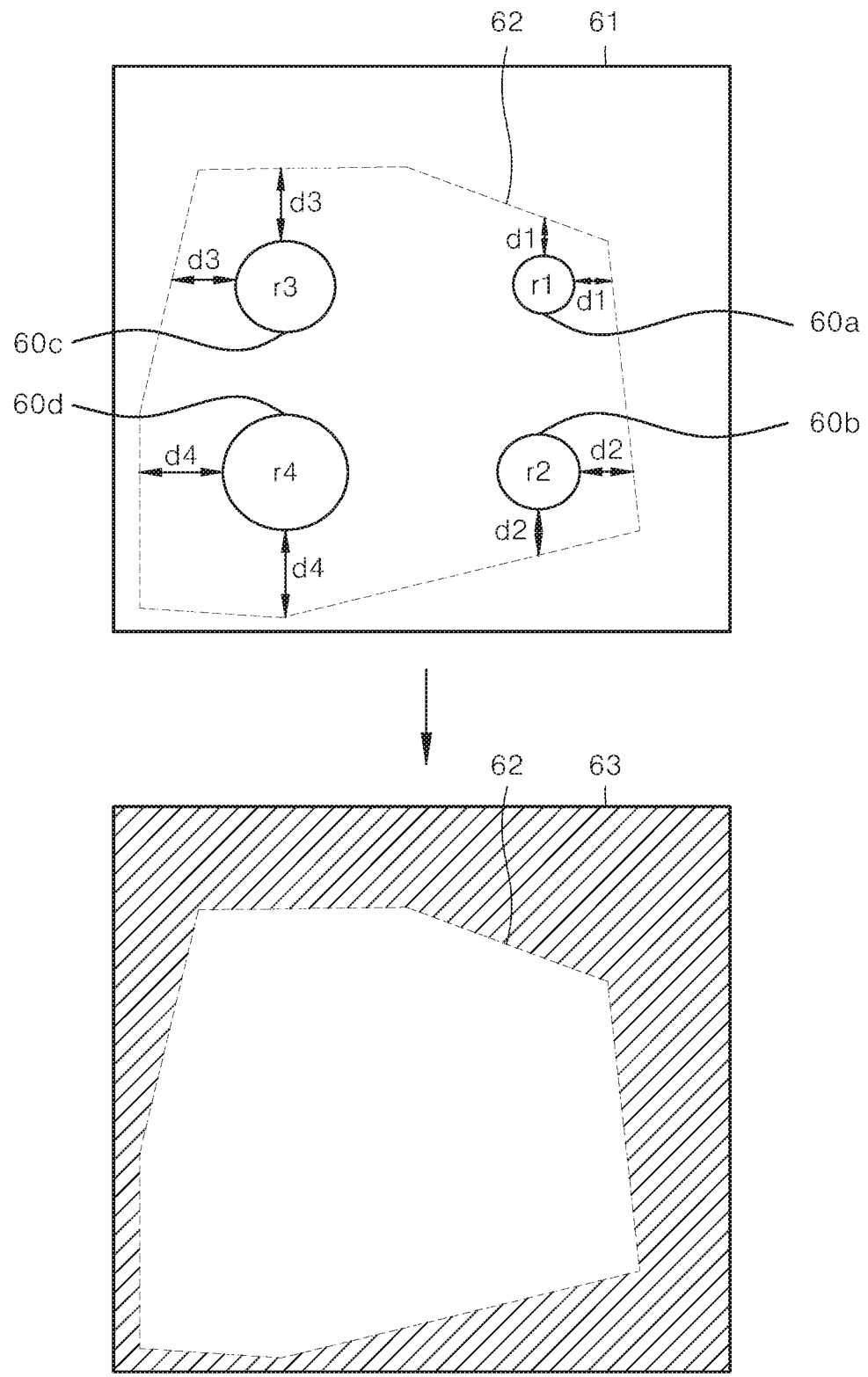

FIG. 12 illustrates an example in which the controller 150 sets an effective area differently according to a size of a laser pattern. In FIG. 12, the controller 150 may calculate a distance of an area in which a pattern is reflected in inverse proportion to the size of the pattern. Alternatively, the controller 150 may set an effective area by reflecting the distance.

When the laser output part 130 outputs lasers in patterns having the same size, the controller 150 may verify a distance between an area in which a laser pattern is marked and the identification device using a size of the laser pattern included in the captured image.

That is, when a size of the laser pattern is large, the controller 150 determines that an object reflecting the laser pattern is disposed to be close to the identification device. Similarly, when the size of the laser pattern is small, the controller 150 determines that an object reflecting the laser pattern is disposed to be away from the identification device.

When a boundary line of the effective area is set, the controller 150 may increase a distance between an object at short distance and the boundary line of the effective area and decrease a distance between an object at long distance and the boundary line of the effective area.

A reference numeral 61 of FIG. 12 indicates an image in which four laser patterns 60a, 60b, 60c, and 60d are marked. Each of r1, r2, r3, and r4 in the laser patterns is a size of each of the laser patterns. A size relationship between the laser patterns satisfies r1<r2<r3<r4.

The controller 150 determines that an area in which the laser pattern 60d is reflected in a lower left side is an area of a closest disposed object. The controller 150 sets the boundary line of the effective area around the laser pattern 60d by separating the boundary line by as much as a d4. The d4 is proportionate to the r4.

The controller 150 sets the boundary line of the effective area around the laser pattern 60c by separating the boundary line by as much as a d3. Here, the d3 has a value that is smaller than that of the d4.

The controller 150 sets the boundary line of the effective area around the laser pattern 60b by separating the boundary line by as much as a d2. Here, the d2 has a value that is smaller than that of the d3.

The controller 150 sets the boundary line of the effective area around the laser pattern 60a by separating the boundary line by as much as a d1. Here, the d1 has a value that is smaller than that of the d2.

Like a relationship of d1<d2<d3<d4, the controller 150 may differently set the distances which are separated from the laser pattern according to the sizes of the laser patterns. The controller 150 sets an effective area 62 on the basis of the distances.

The controller 150 may generate a mask 63 which removes an area except for the effective area 62.

Further, the controller 150 may calculate a separation distance of an object on the basis of the sizes of the laser patterns. For example, the controller 150 stores the separation distance of the object according to the size of the laser pattern. Then, when the size of the laser pattern included in the image is r1, the controller 150 may determine that a distance between the identification device 100 and an object which is marked by the laser pattern is 10 m. Here, the numerical value is illustrative.

Similarly, when the size of the laser pattern included in the image is r2, the controller 150 may determine that a distance between the identification device 100 and an object which is marked by the laser pattern is 7 m.

Figure 13:
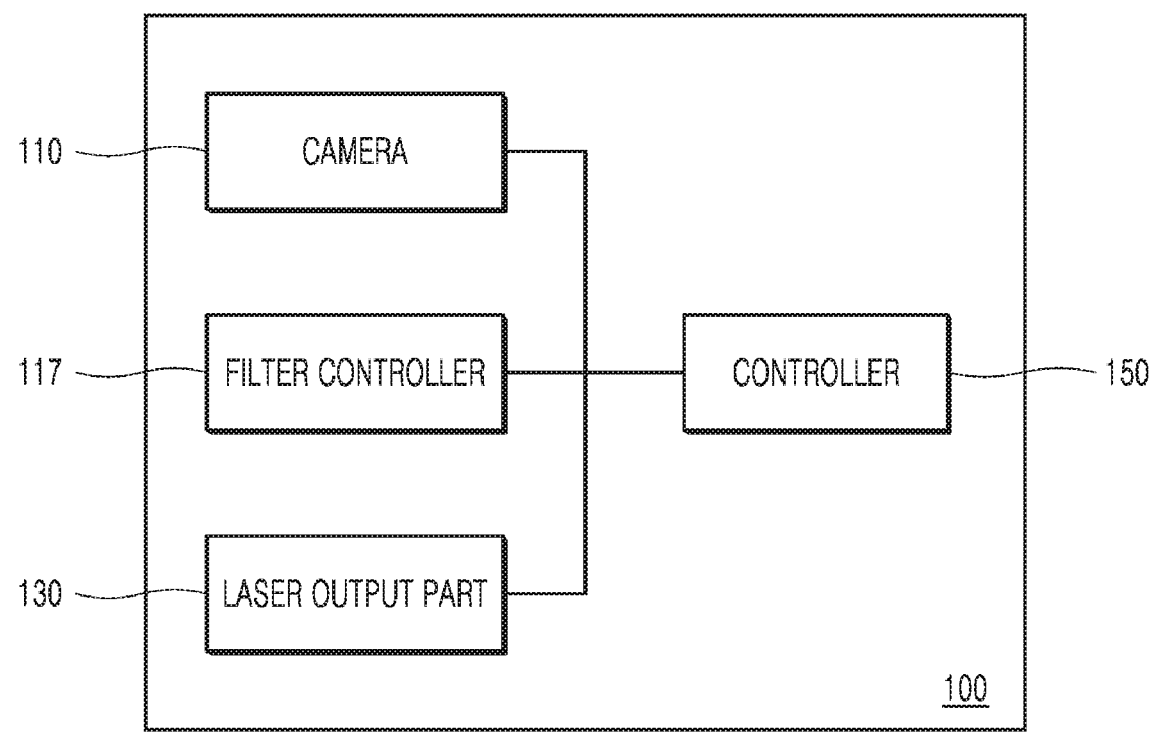

FIGS. 13 and 14 are diagrams illustrating an identification device including a single camera according to another embodiment of the present invention. FIG. 15 is a diagram illustrating an image generated by the identification device of FIGS. 13 and 14.

When compared with the configurations of FIGS. 1 and 2, FIGS. 13 and 14 illustrate configurations in which a single camera 110 may capture an image. To this end, a filter controller 117 is added. The filter controller 117 selectively disposes a laser filter 115 in the camera 110. That is, the filter controller 117 may dispose the laser filter 115 on a front surface of the camera 110 and then move the laser filter 115 from the front surface of the camera 110.

A reference numeral 71 of FIG. 14 indicates a state in which the laser filter 115 is disposed in front of the camera 110 by the filter controller 117. In this case, a laser output part 130 outputs a laser. When the camera 110 captures an object in the state 71, a laser pattern is displayed on an image indicated by a reference numeral 73 of FIG. 16.

Meanwhile, when the filter controller 117 moves the laser filter 115 in front of the camera 110 to another area in a state indicated by a reference numeral 72 of FIG. 14, the camera 110 may capture an image without the laser filter. In this case, the laser output part 130 does not output the laser.

When the camera 110 captures an object in the state 72, an image having no laser pattern, indicated by a reference numeral 74 of FIG. 15, is generated.

Accordingly, the controller 150 may generate a mask on the basis of the image 73 including the laser pattern and the image 74 including no laser pattern in the same direction under the control of the filter controller 117. A difference between the images 73 and 74 may vary according to a difference in image generation time. When the filter controller 117 shortens a time to flip the laser filter 115 in front of the camera 110, the difference between the images 73 and 74 converges to zero.

The above-described identification device may be included in various devices. For example, the above-described identification device may be disposed in an autonomous driving robot or an autonomous driving vehicle. Further, the identification device may be a mobile phone or a smart phone. The identification device 100 may variously classify an image captured by a device such as a smart phone, a mobile phone, or a camera.

To summarize FIGS. 13 and 14, the laser filter is selectively disposed in a single camera 110, and the first image including a pattern of the laser which is reflected from an object and the second image including no pattern are generated. Further, the controller 150 generates a mask for distinguishing an effective area using the pattern included in the first image and extracts a feature from the second image by applying the mask to the second image.

Here, the first image and the second image are images captured by the same camera 110, and there is only a difference in whether the captured times are different and whether the laser pattern is included or not. Therefore, the object included in the first image and the second image is not significantly varied.

The identification device of FIGS. 13 and 14 may also perform effective area determination and mask generation on the basis of the above-described pattern.

The controller 150 may calculate N features from the second image captured by the camera 110 without the laser filter. Then, the controller 150 calculates an overlapping area by comparing the first image captured by the camera 110 by applying the laser filter (which is an image including the laser pattern) and the above-described second image and applies a mask to the second image. Consequently, unnecessary portions are removed from the second image so that the controller 150 selects M features among the N features. Here, M≤N is satisfied.

Figure 16:
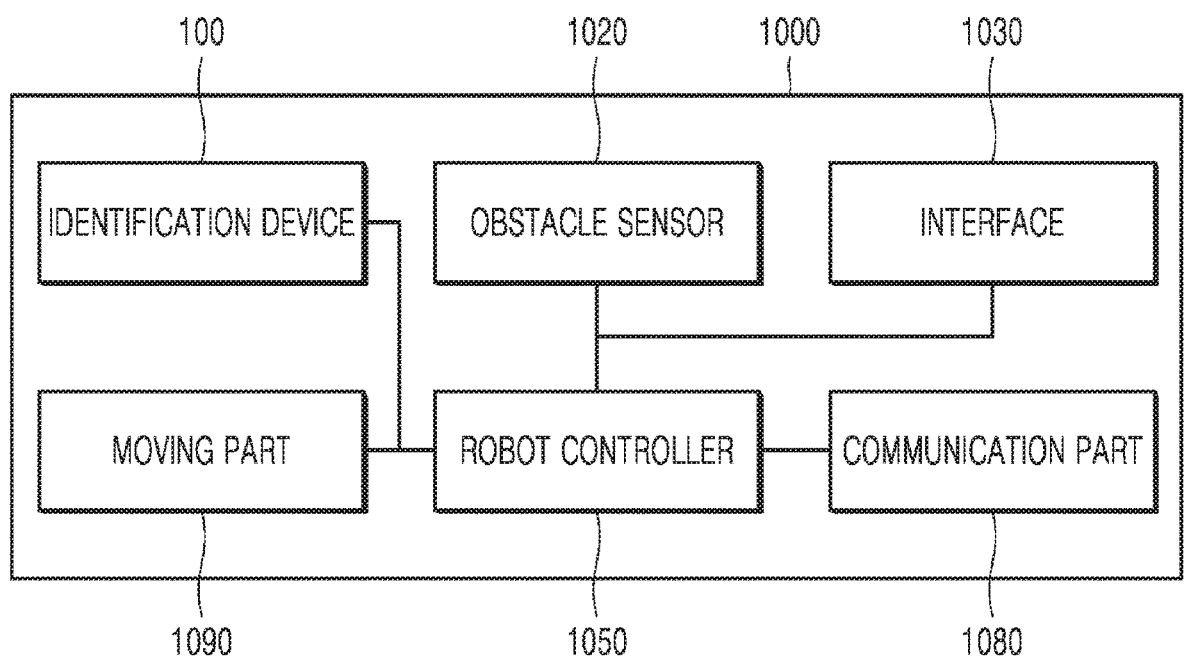
FIG. 16 is a block diagram illustrating an example of an identification device implemented in a robot according to one embodiment of the present invention.

FIG. 16 is a block diagram illustrating an example of an identification device implemented in a robot according to one embodiment of the present invention.

The identification device may be mounted on a robot 1000. The robot 1000 recognizes objects disposed at short distance using the identification device 100. Examples of the robot 1000 include a guide robot, a cart robot, a cleaning robot, and the like. The robot 1000 may autonomously move under the control of the identification device 100.

A moving part 1090 moves the robot along a movement path generated by a robot controller 1050. The moving part 1090 may move the robot by rotating a wheel which is a component. The robot controller 1050 may generate the movement path of the robot on the basis of a feature in a front image selected by the identification device 100.

The obstacle sensor 1020 senses obstacles disposed in the vicinity of the robot. The obstacle sensor 1020 may sense a distance between the robot and a person, a wall, an object, a fixed object, an installed object, or the like. Further, the obstacle sensor 1020 may capture images of an object, a person, and an installed object in the vicinity of the robot.

An interface 1030 includes a display screen, and the robot 1000 outputs predetermined information or receives an instruction from a user through the interface 1030. The interface 1030 may include a microphone and receive a voice command from the user.

A communication part 1080 transmits and receives information to and from the outside.

The robot controller 1050 of FIG. 16 may additionally include an artificial intelligence module. The robot controller 1050 may verify the surroundings of the robot by inputting the mask generated by the identification device 100, a feature point in the image, and the distance to an obstacle, which is sensed by the obstacle sensor 1020, into the artificial intelligence module in the robot controller 1050.

An example of the artificial intelligence module includes machine learning or a deep learning network.

The robot controller 1050 may perform context awareness using the artificial intelligence module. Similarly, the robot controller 1050 may recognize a state of the robot 1000 using sensed values, user control, or information received from another cart robot or server as input values of the artificial intelligence module.

Further, the robot controller 1050 may determine accuracy of the mask and the feature points in the image, which are generated by the identification device 100, using the artificial intelligence module. That is, the robot controller 1050 may perform image processing.

The above-described artificial intelligence module may include an inference engine, a neural network, and a probability model. Further, the artificial intelligence module may perform supervised learning or unsupervised learning on the basis of various pieces of data.

Further, the artificial intelligence module may perform natural language processing so as to recognize a voice of the user and extract information from the recognized voice.

FIG. 17 is a flowchart illustrating a process of extracting a feature from an image by the identification device according to one embodiment of the present invention.

The laser output part 130 of the identification device 100 outputs a laser (S81). The first camera 110 generates a first image including a pattern of the laser which is reflected from an object using the laser filter 115 (S82).

Meanwhile, the second camera 120 captures an area overlapping an area captured by the first camera 110 to generate a second image (S83).

The controller 150 generates a mask which distinguishes an effective area using the pattern included in the first image. Further, the controller 150 extracts a feature from the second image by applying a mask to the second image (S84).

The flowchart of FIG. 17 may also be applied to the configurations of FIGS. 13 and 14.

When the above-described embodiments are applied, feature matching is performed using an image which is captured using a camera capturing a two-dimensional image. In order to extract and match features of an important object in the feature matching process, the controller 150 may set meaningless data (an image of an object at long distance) in the image as an outlier and controls to remove the meaningless data from the image or to not extract a feature from the object at long distance.

Further, the controller 150 may use a laser pattern so as to distinguish the object at long distance from an object at short distance in the captured image. On the basis of a physical characteristic of the laser being reflected from an object, the identification device 100 or the robot 1000 including the identification device 100 may provide a pseudo laser depth function to verify depth information from the image of the object.

Further, since the controller 150 extracts features from images of objects at short distance (at a distance at which the laser pattern is reflectable), the controller 150 may extract only important features. Consequently, the controller 150 may improve matching performance.

Even though all components configuring the embodiments of the present invention are described to be combined as one unit or to operate as a combination thereof, the present invention is not limited to these embodiments. Alternatively, all of the components may operate by being selectively coupled to one or more within the scope of the present invention. Further, all of the components may each be implemented in a single independent piece of hardware. However, a part or an entirety of each of the components may be selectively combined to be implemented as a computer program having a program module which performs some or all of functions combined in one or a plurality of pieces of hardware. Codes and code segments constituting the computer program may be easily deduced by those skilled in the art to which the present invention pertains. The computer program may be stored in a computer-readable storage medium and may be read and executed by a computer, thereby realizing the embodiments of the present invention. The storage medium of the computer program includes a magnetic recording medium, an optical recording medium, and a storage medium including a semiconductor recording element. Further, the computer program implementing the embodiments of the present invention includes a program module which is transmitted in real time through an external device.

While the present invention has been particularly shown and described with reference to exemplary embodiments thereof, it should be noted that many alternations and modifications will be made by those skilled in the art. Therefore, it may be understood that such changes and modifications are intended to be included within the spirit and scope of the present invention as long as they do not depart from the scope of the present invention.

What is claimed is:

1. An identification device for extracting a feature from an image using a laser pattern, the identification device comprising:
   a laser output part configured to output a laser;
   a first camera coupled to a laser filter and configured to generate a first image including a pattern of the laser reflected from an object, wherein the pattern has an interval with another pattern, wherein the interval between the pattern is a specific distance;
   a second camera configured to capture an area overlapping an area captured by the first camera to generate a second image; and
   a controller configured to:
   synchronize the first camera, the second camera, and the laser output part based on a moving speed of the identification device;
   determine a short distance object and a long distance object relative to the identification device, wherein the short distance object reflects the pattern and the long distance object does not reflect the pattern;

generate a mask for distinguishing an effective area by removing the long distance object using the pattern included in the first image, wherein the effective area includes an area with the short distance object; and extract a feature from the second image by applying the mask to the second image.

2. The identification device of claim 1, wherein:

the controller is further configured to:

generate a boundary line of a separation distance on the basis of a pattern located on an outer portion among a plurality of patterns to generate the effective area; and generate the mask to leave only the effective area in the first image.

3. The identification device of claim 2, wherein:

when the plurality of patterns are disposed in the first image, the controller is further configured to determine the separation distance by reflecting a distance between the plurality of patterns; or when the plurality of patterns are included within a boundary line of a same object in the first image, the controller is further configured to include an area within the boundary line in the effective area.

4. The identification device of claim 2, wherein, when a pattern having a different shape than the pattern output by the laser output part is included in the first image, the controller is further configured to extend a cross section of the pattern having the different shape to generate the effective area.

5. The identification device of claim 1, wherein the controller is further configured to calculate a distance of an area in which the pattern is reflected in inverse proportion to a size of the pattern.

6. The identification device of claim 1, wherein:

the second image includes N features; and the controller is configured to: calculate an overlapping area by comparing the first image with the second image and select M features among the N features by applying the mask to the overlapping area.

7. The identification device of claim 1, wherein:

the identification device is a robot; and the identification device further comprises:

an obstacle sensor configured to sense an object disposed in a vicinity of the robot;

a robot controller configured to generate a movement path of the identification device on the basis of the feature extracted by the identification device; and a moving part configured to move the identification device along the movement path.

8. An identification device for extracting features from an image using a laser pattern, the identification device comprising:

a laser output part configured to output a laser;

a camera having a laser filter which is selectively disposed therein and configured to generate a first image including a pattern of the laser reflected from an object and a second image not including the pattern, wherein the pattern has an interval with another pattern, wherein the interval between the pattern is a specific distance;

a filter controller configured to selectively dispose the laser filter on the camera and flip the laser filter in front of the camera; and a controller configured to:

synchronize the camera and the laser output part based on a moving speed of the identification device;

determine a short distance object and a long distance object relative to the identification device, wherein the short distance object reflects the pattern and the long distance object does not reflect the pattern;

generate a mask for distinguishing an effective area by removing the long distance object using the pattern included in the first image, wherein the effective area includes an area with the short distance object; and extract features from the second image by applying the mask to the second image.

9. The identification device of claim 8, wherein:

the controller is further configured to generate a boundary line of a separation distance on the basis of a pattern located on an outer portion of the pattern to generate the effective area; and the controller is further configured to generate the mask to leave only the effective area in the first image.

10. The identification device of claim 9, wherein:

when a plurality of patterns are disposed in the first image, the controller is further configured to determine the separation distance by reflecting a distance between the plurality of patterns; or when the plurality of patterns are included within a boundary line of a same object in the first image, the controller is further configured to include an area within the boundary line in the effective area.

11. The identification device of claim 9, wherein, when a pattern having a different shape than the pattern which is output by the laser output part is included in the first image, the controller is further configured to extend a cross section of the pattern having the different shape to generate the effective area.

12. The identification device of claim 8, wherein the controller is further configured to calculate a distance of an area in which the pattern is reflected in inverse proportion to a size of the pattern.

13. The identification device of claim 8, wherein:

the second image includes N features; and the controller is further configured to select M features among the N features by applying the mask to the second image.

14. The identification device of claim 8, wherein:

the identification device is a robot; and the identification device includes:

an obstacle sensor configured to sense an object disposed in a vicinity of the robot;

a robot controller configured to generate a movement path of the identification device on the basis of the features extracted by the identification device; and a moving part configured to move the identification device along the movement path.

15. A method of extracting a feature from an image using a laser pattern, the method comprising:

synchronizing, by a controller, a first camera, a second camera, and a laser output part based on a moving speed of an identification device, wherein the identification device comprises the controller, the first camera, the second camera, and the laser output part;

outputting, by the laser output part, a laser;

generating, by the first camera, a first image including a pattern of the laser reflected from an object using a laser filter, wherein the pattern has an interval with another pattern, wherein the interval between the pattern is a specific distance;

capturing, by the second camera, an area overlapping an area captured by the first camera to generate a second image;

determining, by the controller, a short distance object and a long distance object relative to the identification device, wherein the short distance object reflects the pattern and the long distance object does not reflect the pattern; and generating, by the controller, a mask for distinguishing an effective area by removing the long distance object using the pattern included in the first image, wherein the effective area includes an area with the short distance object.

16. The method of claim 15, wherein:
the controller includes the pattern and generates a boundary line of a separation distance on the basis of a pattern located on an outer portion among a plurality of patterns to generate the effective area; and
the controller generates the mask to leave only the effective area in the first image.

17. The method of claim 16, further comprising:
when a plurality of patterns are disposed in the first image, determining, by the controller, the separation distance by reflecting a distance between the plurality of patterns; or
when the plurality of patterns are included within a boundary line of a same object in the first image, including, by the controller, an area within the boundary line in the effective area.

18. The method of claim 16, further comprising, when a pattern having a different shape than the pattern output by the laser output part is included in the first image, extending, by the controller, a cross section of the pattern having the different shape to generate the effective area.

19. The method of claim 15, wherein the controller calculates a distance of an area in which the pattern is reflected in inverse proportion to a size of the pattern.

20. The method of claim 15, wherein:
the second image includes N features; and
the method further comprises: calculating, by the controller, an overlapping area by comparing the first image with the second image and selects M features among the N features by applying the mask to the overlapping area.

* * * * *